United States Patent [19]
Neely

[11] Patent Number: 5,142,776
[45] Date of Patent: Sep. 1, 1992

[54] METHOD AND APPARATUS FOR HEAT SEALING OF JOINTS AND CONNECTIONS

[75] Inventor: Nicholas H. Neely, Norcross, Ga.

[73] Assignee: Kabelmetal Electro GmbH, Fed. Rep. of Germany

[21] Appl. No.: 672,522

[22] Filed: Mar. 18, 1991

[51] Int. Cl.⁵ ............................................. H01R 43/00
[52] U.S. Cl. ..................................... 29/859; 29/268;
29/270; 29/280; 29/282; 24/509; 24/510;
606/151; 606/157; 606/158; 606/201; 81/386;
81/391; 81/487
[58] Field of Search .................. 29/738, 859, 267, 268,
29/270, 280, 282, 283; 24/509, 510, 498, 489;
606/151, 157, 158, 201, 205, 206, 207; 81/386,
391, 487

[56]  References Cited
U.S. PATENT DOCUMENTS

| | | | |
|---|---|---|---|
| 1,615,889 | 2/1927 | Senn | 24/509 |
| 2,980,977 | 4/1961 | Hefford | 24/510 X |
| 3,379,218 | 4/1968 | Conde . | |
| 3,455,336 | 7/1969 | Ellis . | |
| 4,085,286 | 4/1978 | Horsma et al. . | |
| 4,123,047 | 10/1978 | Koht et al. . | |
| 4,298,415 | 11/1981 | Nolf . | |
| 4,344,909 | 8/1982 | DeBlauwe . | |
| 4,400,579 | 8/1983 | Nolf . | |
| 4,410,379 | 10/1983 | Franckx . | |
| 4,490,426 | 10/1984 | Franckx . | |
| 4,560,828 | 10/1985 | Franckx et al. . | |
| 4,625,073 | 11/1986 | Bresch et al. . | |
| 4,641,009 | 2/1987 | Vansant et al. . | |
| 4,641,402 | 2/1987 | Vansant et al. . | |
| 4,648,924 | 3/1987 | Nolf . | |
| 4,680,065 | 7/1987 | Vansant et al. . | |
| 4,689,474 | 8/1987 | Overbergh et al. . | |
| 4,734,543 | 3/1988 | Nolf . | |
| 4,860,799 | 8/1989 | Van Noten . | |

FOREIGN PATENT DOCUMENTS 2413623  2/1975  Fed. Rep. of Germany .

OTHER PUBLICATIONS

Abstract from Aircraft Engr. 60 (11) Nov. 1988 p. 13.
Raychem Corporation's article entitled: Thermofit Tubing Splice Encapsulation Directions; 1968.
XAGA250 Distribution Splice Closure System.
Raychem Telecom Product Directory 1990-1991.
Kabelmetal Electro Pexolan ®—Products.
XAGA1600 Buried Splice Closure Polyurethane Encapsulated Method.
Raychem Thermofit ATUM Dual Well Heat Shrinkable Tubing.
Raychem TELECOM Product Directory 1989.

Primary Examiner—Carl J. Arbes
Attorney, Agent, or Firm—Ware, Fressola, Van Der Sluys & Adolphson

[57] ABSTRACT

In a heat sealing operation for environmentally isolating joints and connections, a spring actuated clamp is utilized to provide positive engagement of the heat shrinkable material in the area between the members being connected. The clamp has two juxtaposed clamp arms with opposed convex clamping jaws. The clamp arms are resiliently loaded by a coil spring so the convex surfaces on the clamping jaws are placed into a clamping relationship on the heat shrinkable material.

21 Claims, 2 Drawing Sheets

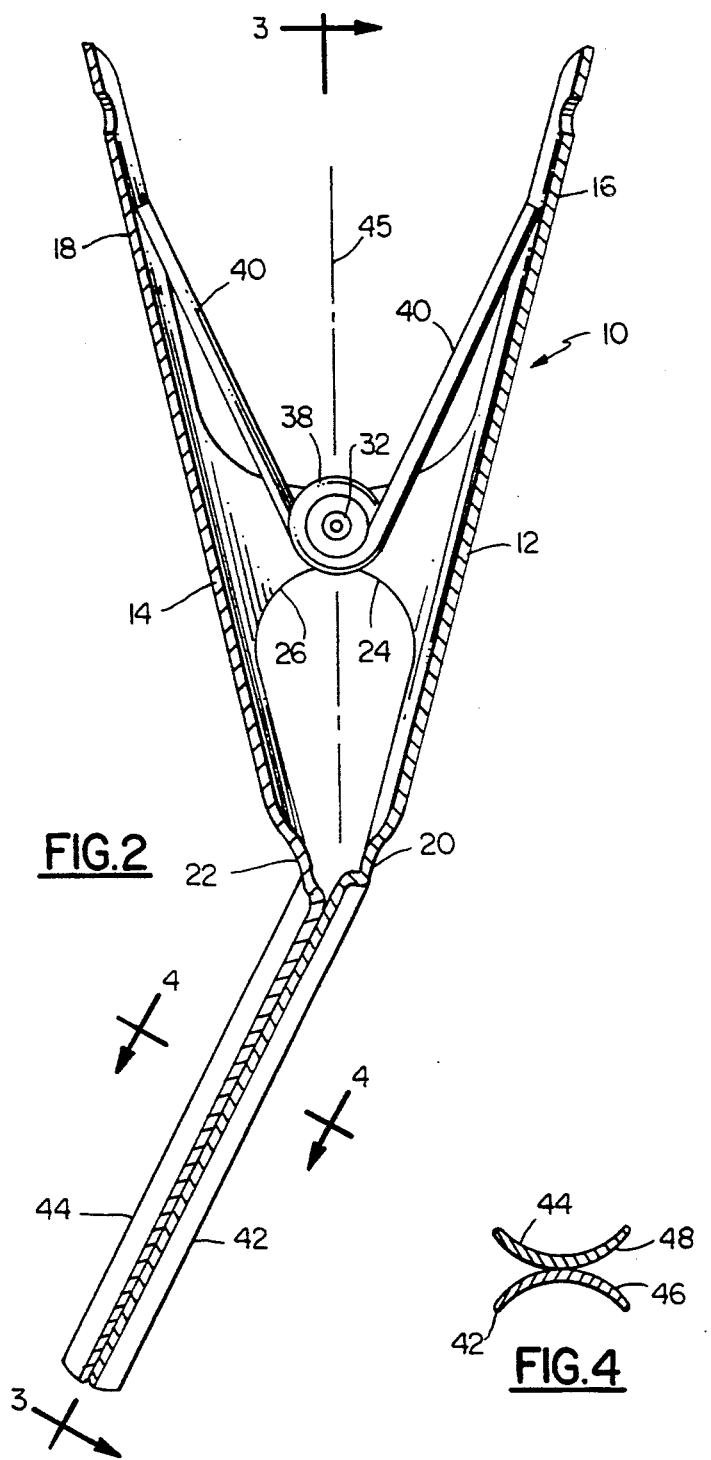
FIG.2
FIG.4
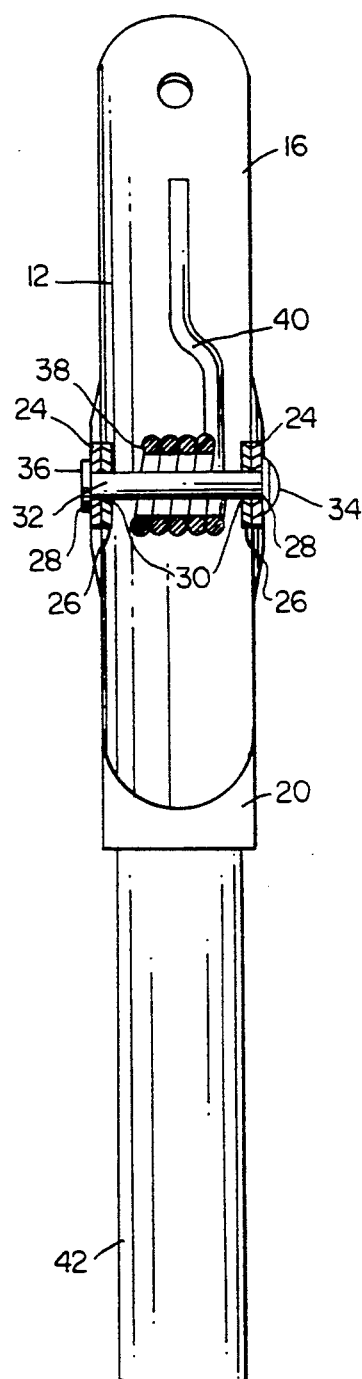
FIG.3

METHOD AND APPARATUS FOR HEAT SEALING OF JOINTS AND CONNECTIONS

BACKGROUND OF THE INVENTION

1. Field of the Invention

The present invention relates to spliced joints and connections for wires, optical fiber cables and the like and, more particularly, to a method and apparatus for making heat sealed spliced joints and connections.

2. Description of the Prior Art

Using heat shrinking techniques for providing protection to joints, connections and splices between electrical cables, optical fiber cables, and the like has long been an accepted practice. During the joining and splicing of cables, it is often necessary to branch cables, whereby a large cable coming into a joint is branched into two cables going out of the joint. This is often called a "Y" transition. When such joints are formed utilizing adhesive lined heat shrinkable tubes or sleeves to environmentally isolate the joint, it is well established that by using tools, such as long needle nosed pliers, it is possible to form a seal between the two outgoing cables. It is necessary to squeeze down on the area between the outgoing cables because the heat shrinkable material tends to form in straight lines across the outgoing cables and refuses to come together in this area by itself.

In an article by Raychem Corporation in 1968 entitled "Thermofit Tubing Splice Ecapsultion Directions", the procedure for making a splice is described. Two wires are twistedly connected and the entire connection is then sealed using a heat shrinkable tubing. While the tubing is still hot, a needle nose pliers is used to close down the heat shrinkable material extending between the pair of wires. This technique does not create a smooth joint because of the interaction between the sharp edges on the pliers and the heat shrinkable material. Additionally, this technique inconveniently requires the user to hold the pliers and exert pressure thereon during the joint forming process.

Another form of splice seal is shown in U.S. Pat. No. 4,085,286 owned by Raychem Corporation. A heat recoverable material is first clamped, heated and expanded to form an enlarged version of the splice seal. The cables to be joined are then put in place and the previously formed heat recoverable material is clamped, heated and shrunk to form the desired environmentally encapsulated splice.

In U.S. Pat. No. 4,123,047, also owned by Raychem Corporation, a series of hand operated clips are used to hold a heat shrinkable material wrapped on an object to be shrink wrapped. Each clip has a pair of bond line gripping flanges attached to a pair of ventilated cooperating jaw plates to squeeze the material together along a bond line.

Another device for preparing "Y" transition joints is shown in Raychem Corporation's U.S. Pat. No. 4,648,924. It comprises, in one embodiment, an elongated clip having a pair of legs joined at one end whereby a channel is found therebetween. After an incoming cable and two outgoing cables are joined and heat shrinkable tubing is inserted thereover, the elongated clip is inserted into the area between the outgoing cables to grasp the heat shrinkable material therein and hold it together. Thereafter, heat is supplied to heat shrink the material and seal the joint. However, the size of the clip makes it difficult to insert and remove, especially when the area is hot.

The present invention is designed to overcome the above-noted limitations that are attendant upon the use of the foregoing prior art methods and devices. Toward this end, it contemplates the provision of a novel method and apparatus for heating sealing joints and connections which include a spring loaded tool so the user does not have to be skilled in forming branching joints with heat shrinkable material.

It is an object of the invention to provide a novel method and apparatus in which the clamp can be employed before, during or after the application of heat to the heat shrinkable material around the joint being sealed.

It is also an object to provide such a method and apparatus to eliminate the hazard and inconvenience presented by the prior art procedures and devices.

Still another object is to provide such a method and apparatus in which the clamp has smooth, convex clamping jaws without sharp edges to contact the heat shrinkable material.

A further object is to provide such an apparatus which may be readily and economically fabricated and will enjoy a long life in operation.

SUMMARY OF THE INVENTION

It has now been found that the foregoing and related objects can be readily attained in a method for performing a heat sealing operation for environmentally isolating joints and connections comprising the steps of providing a pair of juxtaposed elongated members having ends prepared for connection, providing a third elongated member with its end prepared for connection to the ends of the pair of elongated members, connecting the three elongated members at their ends, providing a heat shrinkable material and surrounding at least the connected ends of all three of the elongated members with the heat shrinkable material, using a clamp to hold the heat shrinkable material together in an area between the pair of juxtaposed elongated members, and heating the heat shrinkable material to shrink the material around the connected ends of the three elongated members to environmentally isolate the connected ends.

Ideally, the clamp includes two pivotally connected juxtaposed clamp arms, each of the clamp arms having an elongated clamping jaw with a convex surface thereon. The clamping jaws extend outwardly from the clamp arms with the convex surfaces in an opposed relationship. A spring is operatively connected to the juxtaposed clamp arms to resiliently load the same to place the convex surfaces into a clamping relationship with the heat shrinkable material therebetween.

Conveniently, the spring is a coil spring with a central coil body. The spring has a pair of extending spring arms, the spring arms engaging the juxtaposed arms to provide the resilient loading.

The heating step can be performed after the clamp utilizing step with the clamp still in place in the area between the pair of elongated members when the heating step is performed. Alternatively, the heating step can be performed before the clamp utilizing step with the clamp being placed while the heat shrinkable material is still hot. It is even possible to perform the clamp utilizing step simultaneously with the heating step.

Desirably, the elongated members are insulated electrical wires and the method makes a Y-shaped connection therebetween. The connecting step connects exposed ends of the wires.

The invention will be more fully understood when reference is made to the following detailed description taken in conjunction with the accompanying drawings.

BRIEF DESCRIPTION OF THE DRAWINGS

FIG. 2 is a cross-sectional view of the spring actuated clamp of FIG. 1;

FIG. 3 is a cross-sectional view taken along the 3—3 line of FIG. 2;

FIG. 4 is a cross-sectional view taken along the 4—4 line of FIG. 2;

DETAILED DESCRIPTION OF THE PREFERRED EMBODIMENT

Figure 1:
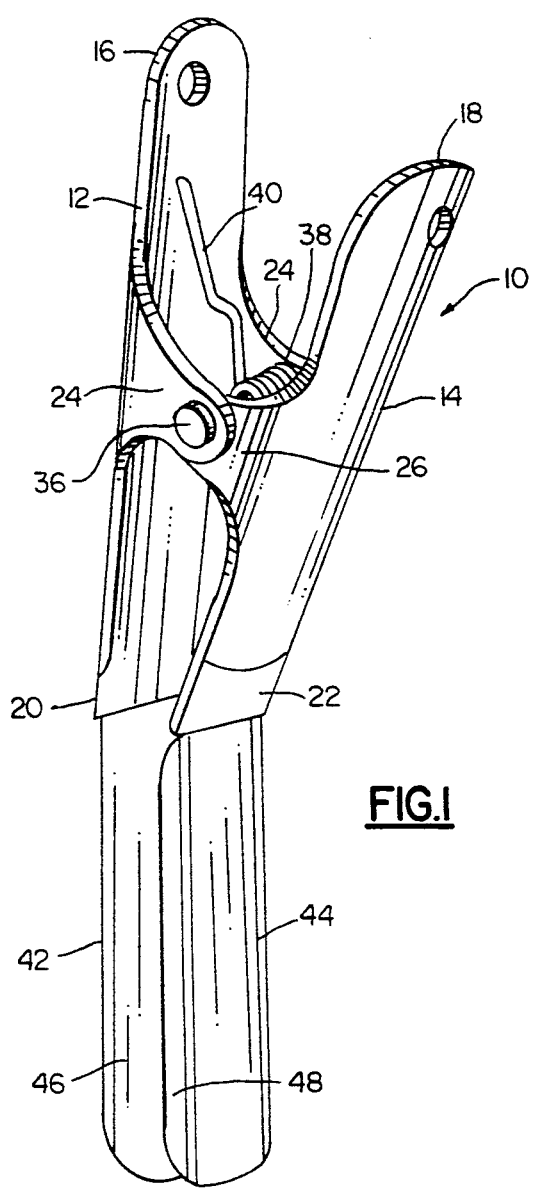
FIG. 1 is a perspective view of a spring actuated clamp as used in the method of the present invention.

Turning first to FIGS. 1 through 4, therein is illustrated a spring actuated clamp embodying the present invention and generally indicated by numeral 10. The spring actuated clamp 10 has a pair of juxtaposed clamp arms 12, 14 made from a material such as aluminum, stainless steel or plain carbon steel. The clamp arms 12, 14 have spaced apart user engageable ends 16, 18 and juxtaposed work engaging ends 20, 22. The clamp arms 12, 14 also have extending ear members 24, 26 which abut and are provided with apertures 28, 30. The clamp arms 12, 14 are pivotally connected by a tubular rivet 32 which passes through the apertures 28, 30 of the ear members 24, 26. The tubular rivet 32 has, on one end, a pivot head 34 and, at the opposite end, a swagable or flared surface end 36.

Surrounding the tubular rivet 32 and biasing the clamp arms 12, 14 is a coil spring 38 with a pair of extending spring arms 40 engaging the associated clamp arms 12, 14. The coil spring 38 is made of metal such as spring steel.

Each of the work engaging ends 20, 22 of the juxtaposed clamp arms 12, 14 have semi-cylindrical channel members 42, 44 welded or otherwise secured thereto at slightly different angles so that they extend at the same included angle of approximately one hundred forty-five degrees (145)relative to the centerline 45 of the clamp 10. The channel members 42, 44 have their convex surfaces 46, 48 facing one another and the coil spring 38 acts on the pivoted juxtaposed clamp arms 12, 14 to bias the channel members 42, 44 into clamping engagement along the longitudinal extent of their convex surfaces 46, 48. The channel members 44, 44 can be made of metal such as aluminum, stainless steel or plain carbon steel.

Figure 5:
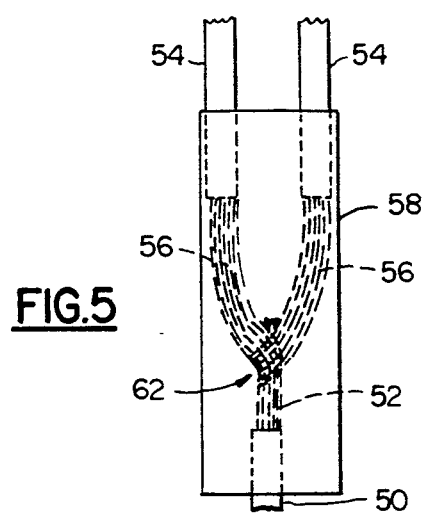
FIG. 5 is a top plan view of a typical "Y" transition connection before undergoing heat shrinkage.

Referring now to FIG. 5, in performing the method invention and utilizing the spring actuated clamp 10, an incoming electrical cable 50 has its end stripped so as to expose electrical wires 52 therein. Outgoing electrical cables 54, to which the incoming electrical cable 50 is to be joined, are also stripped at their ends to expose electrical wires 56 therein. A heat shrinkable tubing 58, lined with heat activated or "hotmelt" adhesive 60 (FIG. 7), is pulled over the outgoing electrical cables 54 until the electrical wires 56 are exposed. Then, the electrical wires 52 of the incoming electrical cable 50 and the exposed electrical wires 56 of the outgoing electrical cables 54 are joined by twisting and soldering as indicated by arrow 62. The heat shrinkable tubing is then pulled back to cover the entire joint as shown in FIG. 5.

Figure 6:
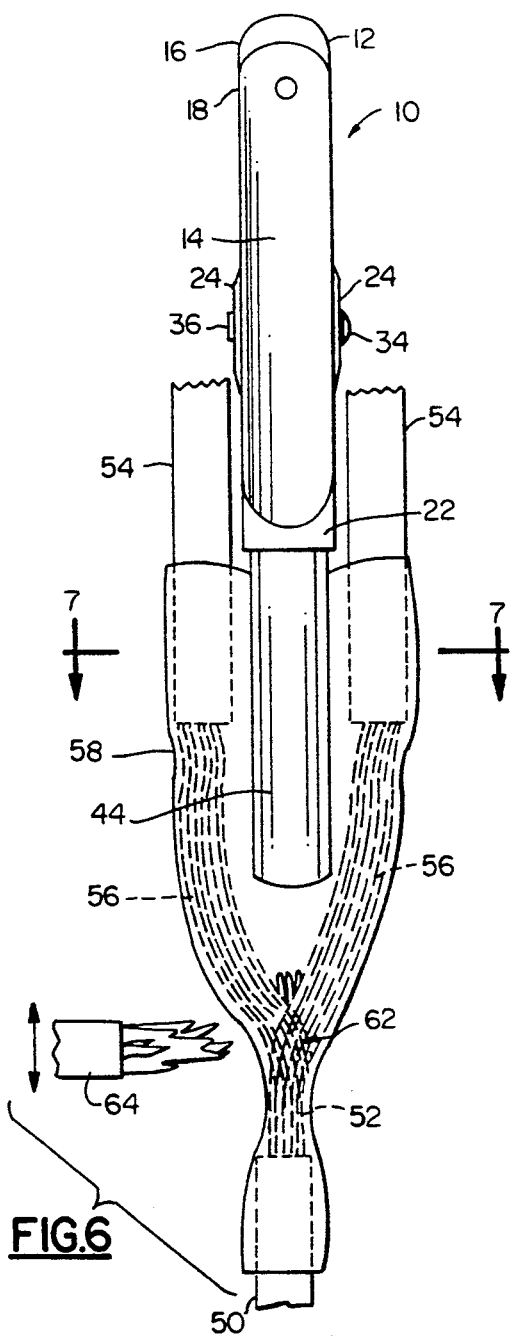
FIG. 6 is a top plan view of the typical "Y" transition connection of FIG. 5 after undergoing heat shrinkage with the spring actuated clamp of the present invention installed in the area between the outgoing cables.
Figure 7:
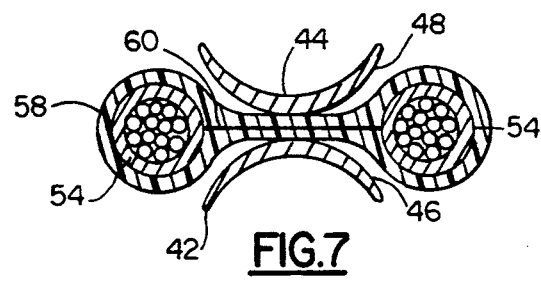
FIG. 7 is a cross-sectional view taken along the 7—7 line of FIG. 6.

To heat seal the joint, the user places the spring actuated clamp 10 so the channel members 42, 44 are in the area between the two outgoing electrical cables 54 with the convex surfaces 46, 48 in clamping engagement with the heat shrinkable tubing 58 as shown in FIGS. 6 and 7. Heat is then applied by an appropriate means such as a propane torch 64 to shrink the heat shrinkable tubing 58 and seal the joint. The combination of the heat shrinkable tubing 58 and the flow of the heat activated adhesive 60 seals and environmentally isolates the electrical wires 52, 56.

In alternative methods, instead of applying the spring actuated clamp 10 to the area between the outgoing electrical cables 54 before the heating step is performed, it has been found that the spring actuated clamp 10 can be placed during the heating process or after the heating step while the heat shrinkable material is still hot.

The spring actuated clamp 10 and the method invention have been disclosed for use with electrical cables but it will be appreciated by those skilled in the art that the method and apparatus of the invention can be used for joining other types of members such as optical fiber cables and the like.

The clamp arms and channel members are preferably stamped or machined from metals such as aluminum stainless steel or plain carbon steel but it should be apparent to those skilled in the art that they can be integrally molded from plastic resins such as polypheonolene sulp (PPS) or polyethyl ethyl keytone (PEEK).

Thus, it can be seen from the foregoing specification and attached drawings that the spring actuated clamp of the present invention provides an effective means for establishing intimate contact of the heat shrinkable material in the area between two closely adjacent members during a heat sealing operation.

The preferred embodiment admirably achieves the objects of the present invention; however, it should be appreciated that departures can be made by those skilled in the art without departing from the spirit and scope of the invention which is limited only by the following claims.

Having thus described the invention, I claim:

1. Method for performing a heat sealing operation for environmentally isolating joints and connections comprising the steps of:

providing a pair of juxtaposed elongated members having ends prepared for connection;

providing another elongated member with its end prepared for connection to said ends of said pair of elongated members;

connecting said another elongated member with said pair of elongated members at their ends;

providing a heat shrinkable material and surrounding at least the connected ends of said another elongated member and said pair of elongated members with said heat shrinkable material; using a clamp to hold said heat shrinkable material together in an area between said pair of elongated members, said clamp including two pivotally connected juxtaposed clamp arms, each of said clamp arms having an elongated clamping jaw with a convex surface thereon, said clamping jaws extending outwardly from said clamp arms with said convex surfaces in an opposed relationship, and means operatively connected to said juxtaposed clamp arms and resiliently loading the same to place said convex surfaces into a clamping relationship with said heat shrinkable material therebetween; and heating said heat shrinkable material to shrink said material around the connected ends of said another elongated member and said pair of elongated members to environmentally isolate the connected ends.

2. The method as set forth in claim 1, wherein said heating step is performed after said clamp utilizing step.

3. The method as set forth in claim 2, wherein said clamp is still in place in the area between said pair of elongated members when said heating step is performed.

4. The method as set forth in claim 1, wherein said heating step is performed before said clamp utilizing step and said clamp is placed while said heat shrinkable material is still hot.

5. The method as set forth in claim 4, wherein said clamp utilizing step is performed as said heating step is performed.

6. The method as set forth in claim 1, wherein said method makes a Y-shaped connection.

7. The method as set forth in claim 1, wherein said heat shrinkable material is a tube of heat shrinkable material.

8. The method as set forth in claim 1, wherein said pair of elongated members and said another elongated member are insulated electrical wires.

9. The method as set forth in claim 8, wherein said connecting step connects exposed ends of said wires.

10. The metnod as set forth in claim 1, wherein said means operatively connected to said juxtaposed clamp arms and resiliently loading the same is a coil spring with a central coil body.

11. The method as set forth in claim 10, wherein said spring has a pair of extending spring arms, the spring arms engaging said juxtaposed arms to provide said resilient loading.

12. The method as set forth in claim 1, wherein said clamping jaws extend outwardly from their respective clamp arm at different angles thereto.

13. The method as set forth in claim 1, wherein said clamping jaws have a semi-cylindrical shape.

14. The method as set forth in claim 13, wherein said clamping jaws engage said heat shrinkable material in clamping relationship along their longitudinal lengths.

15. The method set forth in claim 1, wherein said heat shrinkable material is lined with heat activated adhesive.

16. A clamp for use in a heat stealing operation for environmentally isolating joints and connections comprising two pivotally connected juxtaposed clamp arms; each of said clamp arms having an elongated clamping jaw with a convex surface along its longitudinal length; said clamping jaws extending outwardly from said clamp arms with said convex surfaces in an opposed relationship along their longitudinal lengths; and means operatively connected to said juxtaposed clamp arms and resiliently loading the same to place said convex surfaces into a clamping relationship.

17. The clamp as set forth in claim 16, wherein said means operatively connected to said juxtaposed clamp arms and resiliently loading the same is a coil spring with a central coil body.

18. The clamp as set forth in claim 17, wherein said spring has a pair of extending spring arms, the spring arms engaging said juxtaposed arms to provide said resilient loading.

19. The clamp as set forth in claim 16, wherein said clamping jaws extend outwardly from their respective clamp arms at different angles thereto.

20. The clamp as set forth in claim 16, wherein said clamping jaws have a semi-cylindrical shape.

21. The clamp as set forth in claim 20, wherein said clamping jaws abut in clamping relationship along their longitudinal lengths.

* * * * *

UNITED STATES PATENT AND TRADEMARK OFFICE
CERTIFICATE OF CORRECTION

PATENT NO. : 5,142,776
DATED : September 1, 1992
INVENTOR(S) : Nicholas H. Neely It is certified that error appears in the above-identified patent and that said Letters Patent is hereby corrected as shown below:

Claim 16, column 6, line 14, "stealing" should be --sealing--.

Signed and Sealed this

Nineteenth Day of October, 1993

Attest:

BRUCE LEHMAN

*Attesting Officer*   *Commissioner of Patents and Trademarks*